(12) United States Patent
Shepherd (10) Patent No.: US 11,260,830 B2
(45) Date of Patent: Mar. 1, 2022

(54) REDUCED ARC WINDSHIELD WIPER SYSTEM FOR A VEHICLE

(71) Applicant: Siemens Mobility, Inc., New York, NY (US)

(72) Inventor: Richard Shepherd, Sacramento, CA (US)

(73) Assignee: Siemens Mobility, Inc., New York, NY (US)

( * ) Notice: Subject to any disclaimer, the term of this patent is extended or adjusted under 35 U.S.C. 154(b) by 309 days.

(21) Appl. No.: 16/485,198

(22) PCT Filed: Mar. 30, 2018

(86) PCT No.: PCT/US2018/025364
§ 371 (c)(1),
(2) Date: Aug. 12, 2019

(87) PCT Pub. No.: WO2018/200125
PCT Pub. Date: Nov. 1, 2018

(65) Prior Publication Data
US 2020/0039470 A1 Feb. 6, 2020

Related U.S. Application Data

(60) Provisional application No. 62/488,954, filed on Apr. 24, 2017.

(51) Int. Cl.
*B60S 1/34* (2006.01)
*B60S 1/04* (2006.01)
(Continued)

(52) U.S. Cl.
CPC ............ *B60S 1/3404* (2013.01); *B60S 1/3409* (2013.01); *B60S 1/0458* (2013.01); *B60S 1/22* (2013.01); *B60S 1/4038* (2013.01); *B60S 1/42* (2013.01)

(58) Field of Classification Search
CPC ........ B60S 1/34; B60S 1/3402; B60S 1/3404; B60S 1/3409; B60S 1/3418; B60S 1/3429;
(Continued)

(56) References Cited

U.S. PATENT DOCUMENTS 1,964,109 A 6/1934 Cusset
3,247,540 A 4/1966 Howard et al.
(Continued)

FOREIGN PATENT DOCUMENTS

DE 19709654 A1 9/1998
DE 19742071 C1 4/1999
(Continued)

OTHER PUBLICATIONS

Translation of JPH04173452A. Retrieved from Espacenet on Aug. 2, 2021 (Year: 1992).*

(Continued)

*Primary Examiner* — Orlando E Aviles
*Assistant Examiner* — Thomas Raymond Rodgers (57) ABSTRACT

A windshield wiper system (100) includes a pivoting wiper arm (110); a wiper blade (120) for wiping a surface (102); and a connector assembly (128) coupling the pivoting wiper arm (110) to the wiper blade (120), the connector assembly (128) comprising a gear drive (130) including at least one drive gear (132) and at least one positioning cog (136), wherein the gear drive (130) rotates the wiper blade (120) based on an angular position of the pivoting wiper arm (110) such that an arc of a motion path (320) of the wiper blade (120) is reduced.

12 Claims, 5 Drawing Sheets

(51) Int. Cl.
*B60S 1/22* (2006.01)
*B60S 1/40* (2006.01)
*B60S 1/42* (2006.01)

(58) Field of Classification Search
CPC .......... B60S 1/3447; B60S 1/365; B60S 1/36; B60S 1/26; B60S 1/0458; B60S 1/22; B60S 1/42; B60S 1/4038
USPC ............... 15/250.21, 250.23, 250.3, 250.351
See application file for complete search history.

(56) References Cited

U.S. PATENT DOCUMENTS

| | | |
|---|---|---|
| 8,631,536 B1 | 1/2014 | De Smet |
| 2007/0271722 A1 | 11/2007 | Powell |

FOREIGN PATENT DOCUMENTS

| | | | |
|---|---|---|---|
| JP | S53106935 U | | 8/1978 |
| JP | H04173452 A | * | 6/1992 |
| JP | 2004009824 A | | 1/2004 |

OTHER PUBLICATIONS

PCT International Search Report and Written Opinion of International Searching Authority dated Jul. 9, 2018 corresponding to PCT International Application No. PCT/US2018/025364 filed Mar. 30, 2018.

* cited by examiner

REDUCED ARC WINDSHIELD WIPER SYSTEM FOR A VEHICLE

CROSS REFERENCE TO RELATED APPLICATIONS

This application is the U.S. national stage of International application no. PCT/US2018/025364 filed 30 Mar. 2018, and claims benefit of U.S. provisional application No. 62/488,954 filed 24 Apr. 2017 in the United States Patent and Trademark Office, the content of which is herein incorporated by reference in its entirety.

BACKGROUND

1. Field

Aspects of the present disclosure relate to a reduced arc windshield wiper system which can be utilized in connection with many different types of vehicles. A vehicle as used herein is a motorized or non-motorized vehicle and can be for example a railed vehicle, a motor vehicle, a watercraft or an aircraft.

2. Description of the Related Art

A windshield wiper, also referred to as surface wiper, is a device used to remove rain, snow, ice and debris from a surface such as a windshield. Almost all vehicles, including motor vehicles such as cars and trucks, railed vehicles such as train locomotives, watercraft and some aircraft, are equipped with such wipers which are usually a legal requirement.

A wiper generally comprises a wiper arm, pivoting at one end and with a long wiper blade attached close to the other end of the wiper arm. The wiper arm is powered by a motor, often an electric motor, although pneumatic power is also used in some vehicles. The wiper blade rotates back and forth over the windshield pushing water or other precipitations from its surface. A speed of the wiper arm is normally adjustable, with several continuous speeds and often one or more intermittent settings. Most automobiles use two synchronized radial type arms, while many commercial vehicles use one or more pantograph arms.

SUMMARY

A first aspect of the present disclosure provides a windshield wiper system comprising a pivoting wiper arm; a wiper blade for wiping a surface; and a connector assembly coupling the pivoting wiper arm to the wiper blade, the connector assembly comprising a gear drive including at least one drive gear and at least one positioning cog, wherein the gear drive rotates the wiper blade based on an angular position of the pivoting wiper arm such that an arc of a motion path of the wiper blade is reduced.

A second aspect of the present disclosure provides a vehicle comprising a windshield wiper system as described herein.

DETAILED DESCRIPTION

To facilitate an understanding of embodiments, principles, and features of the present disclosure, they are explained hereinafter with reference to implementation in illustrative embodiments. In particular, they are described in the context of being a windshield wiper system for a vehicle. Embodiments of the present disclosure, however, are not limited to use in the described systems or methods.

The components and materials described hereinafter as making up the various embodiments are intended to be illustrative and not restrictive. Many suitable components and materials that would perform the same or a similar function as the materials described herein are intended to be embraced within the scope of embodiments of the present disclosure.

Figure 1:
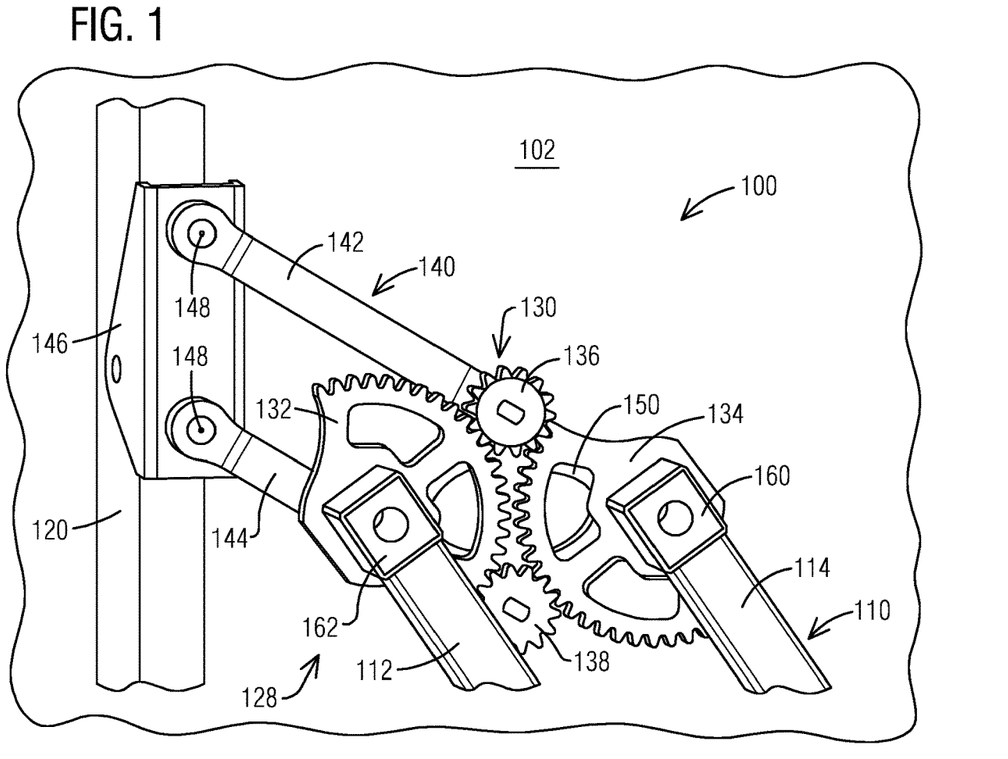
FIG. 1 illustrates a first perspective view of a windshield wiper system in accordance with an exemplary embodiment of the present disclosure.
Figure 2:
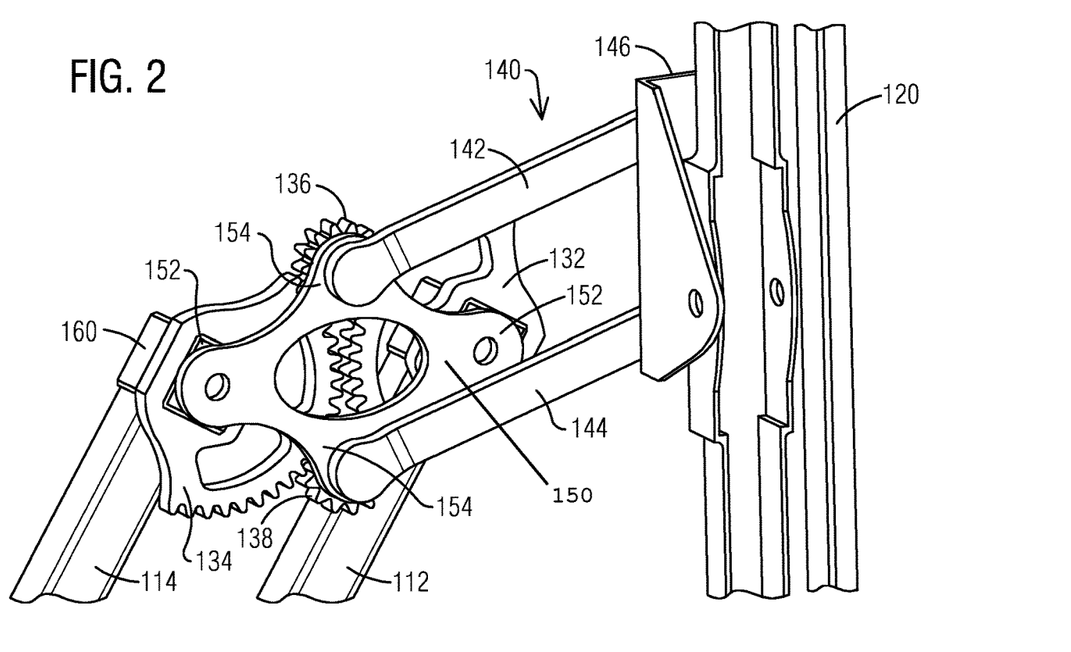
FIG. 2 illustrates a second perspective view of a windshield wiper system in accordance with an exemplary embodiment of the present disclosure.
Figure 3:
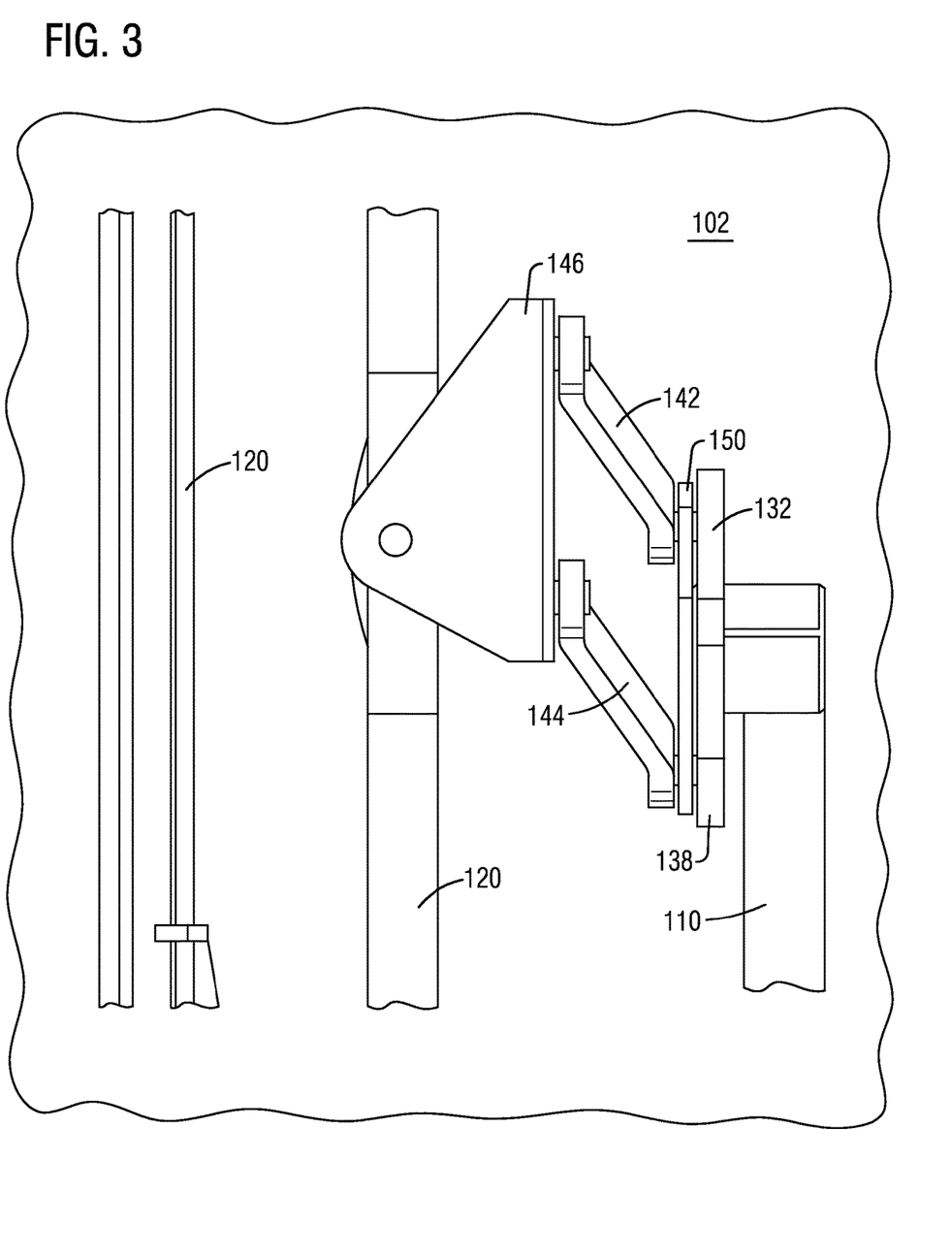
FIG. 3 illustrates a third perspective view of a windshield wiper system in accordance with an exemplary embodiment of the present disclosure.

FIG. 1, FIG. 2 and FIG. 3 illustrate multiple perspective views of a windshield wiper system 100 in accordance with exemplary embodiments of the present disclosure. FIG. 1 illustrates a front view, FIG. 2 a back view and FIG. 3 a side of the windshield wiper system 100.

Known windshield wiper systems include wiper arms that may leave unwiped zones. For example, current wiper systems may trace out a motion path that has a high arc in a center area of the windshield which tends to leave visibility poor where it is needed most, in the center area, particularly in a lower center area of the windshield.

The present disclosure provides an improved windshield wiper system, specifically a reduced arc windshield wiper system, which can be utilized in connection with many different types of vehicles. By altering a position, specifically a height, of a wiper blade as the wiper blade goes through a motion path (during a wiper stroke), an arc made by the wiper blade can be reduced or lowered, thereby leaving less unwiped zones, in particular within the lower center area of the windshield and improving visibility.

With reference to FIG. 1, FIG. 2 and FIG. 3, the windshield wiper system 100 comprises a pivoting wiper arm 110 and a wiper blade 120 for wiping a surface 102. The surface 102 is a windshield of a vehicle, for example a windshield of a railway vehicle. In an exemplary embodiment, the wiper arm 110 comprises first arm member 112 and second arm member 114, arranged in parallel. However, it should be noted that the wiper arm 110 may only comprise one arm member.

The wiper arm 110 and wiper blade 120 are coupled to each other. The wiper blade 120 is coupled to the wiper arm 110 at one end. On the other end, the wiper arm 110 is powered by a motor. During operation, the wiper arm 110 together with the wiper blade 120, rotate or move back and forth over the surface 102 of the windshield thereby removing rain, snow, ice and debris etc. from the surface 102.

A connector assembly 128 is used to couple or connect the wiper arm 110 and the wiper blade 120. According to an exemplary embodiment, the connector assembly 128 comprises a gear drive 130. The gear drive 130 comprises multiple components including for example drive gear(s) and positioning cog(s).

The gear drive 130 comprises at least one drive gear 132 and at least one positioning cog 136. As FIG. 1 and FIG. 2 illustrate, the at least one drive gear 132 is configured as a partial gear, for example a half gear, which means that the drive gear 132 does not comprise teeth over its entire circumference but only over a specific section that is needed for proper operation of the gear drive 130 and the wiper system 100. Thus, material and costs can be saved. However, it should be noted that the drive gear 132 can be configured as a complete gear with teeth over its entire circumference.

The at least one drive gear 132 is coupled to the pivoting wiper arm 110. The at least one gear drive 132 can be directly coupled to the wiper arm 110 or can be coupled to the wiper arm 110 via an adapter 160. In the example according to FIG. 1, FIG. 2 and FIG. 3, where the wiper arm 110 comprises first and second arm members 112, 114, the gear drive 130 comprises first and second drive gears 132, 134, wherein a drive gear 132, 134 is coupled to each arm member 112, 114. Drive gear 132 is coupled to arm member 112 and drive gear 134 is coupled to arm member 114, for example either directly or via first and second adapters 160, 162. The adapters 160, 162 are configured such that the drive gears 132, 134 comprise an opening or cut-out which corresponds to a shape of the adapters 160, 162 so that the drive gears 132, 134 can be pushed or placed over the adapters 160, 162.

The at least one positioning cog 136 is coupled via a swing link 140 to the wiper blade 120. The at least one positioning cog 136 is configured as a complete gear with teeth over its entire circumference. The at least one positioning cog 136 is smaller than the drive gears 132, 134, and has a smaller diameter than the drive gears 132, 134. In accordance with the example of FIG. 1, FIG. 2 and FIG. 3, where the wiper arm 110 comprises first and second arm members 112, 114, and first and second drive gears 132, 134, the gear drive 130 comprises first and second positioning cogs 136, 138, and the swing link 140 comprises first and second swing link members 142, 144. The positioning cogs 136, 138 are coupled via swing link 140 to the wiper blade 120. Specifically, the first positioning cog 136 is coupled via the first swing link member 142 to the wiper blade 120, and the second positioning cog 138 is coupled via the second swing link member 144 to the wiper blade 120.

The positioning cogs 136, 138 and the drive gears 132, 134 are positioned such that the positioning cogs 136, 138 are in engagement with the drive gears 132, 134. The positioning cogs 136, 138 are positioned between the drive gears 132, 134, and both positioning cogs 136, 138 are in engagement with both drive gears 132, 134. During operation of the wiper system 100, the drive gears 132, 134 rotate in a first direction, and the positioning cogs 136, 138 rotate in a second direction which is opposite to the first direction.

As best seen in FIG. 2 and FIG. 3, the swing link 140 comprises swing link members 142, 144, arranged substantially in parallel. At one end, the swing link members 142, 144 are coupled to the wiper arm 120, either directly or via mounting element 146. For example, the swing link members 142, 144 can be fastened by bolts 148 to the mounting element 146, which in turn is fastened to the wiper arm 120. The positioning cogs 136, 138 are arranged at the other end, the opposite end, of the swing link members 142, 144.

As FIG. 2 further illustrates, the connector assembly 128 comprises a backplate 150 located and positioned between the gear drive 130 and the swing link 140. The backplate 150 provides support and stability and further provides that the components of the gear drive 130 (drive gears 132, 134 and positioning cogs 136, 138) are in correct positions and remain in engagement at all times. The backplate 150 can comprise many different shapes but is configured such that it is coupled to the swing link members 142, 144 and the wiper arm members 112, 114. In an exemplary embodiment, the backplate 150 can comprise a shape similar to a diamond or rhombus. Further, the backplate 150 can comprise corners, for example rounded corners 152, 154. Rounded corners 152 are opposite to each other, and rounded corners 154 are opposite to each other. Each rounded corner 152, 154 comprises a bore hole which is used to fasten the backplate 150 to the swing link members 142, 144 and wiper arm members 112, 114, respectively. For example, the backplate 150 can be fastened to the swing link members 142, 144 by bolts which extend from the swing link members 142, 144 through the rounded corners 154 of the backplate 150 to the positioning cogs 136, 138. Further, the backplate 150 can be fastened to the wiper arm members 112, 114 by the rounded corners 152 via the adapters 160, 162.

Figure 4:
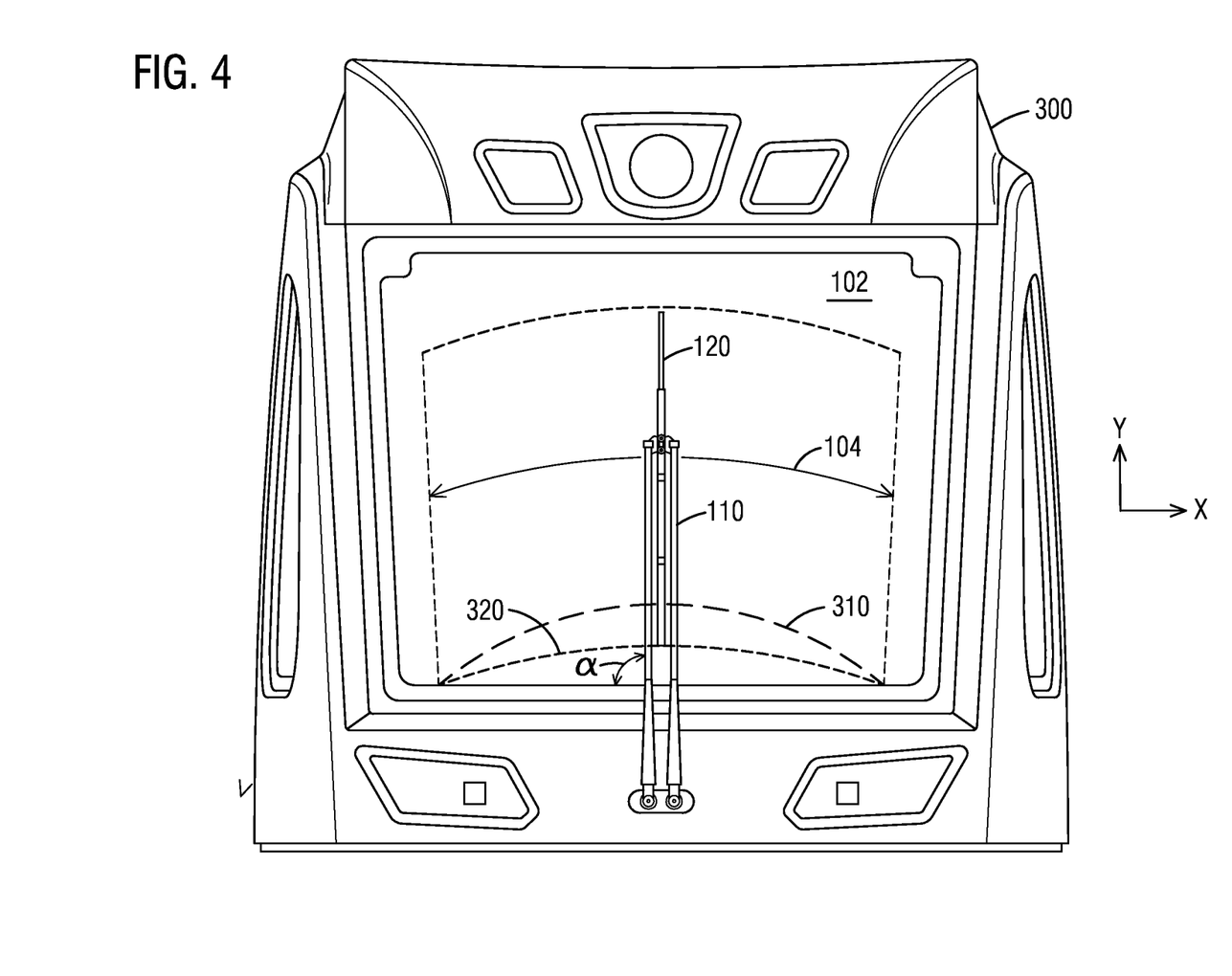
FIG. 4 illustrates a view of a section of a railway vehicle including a windshield wiper system in accordance with an exemplary embodiment of the present disclosure.

Operation of the wiper system 100 means that the wiper system 100 performs wiper strokes 104 (see FIG. 4). During operation of the wiper system 100, the wiper arm 110 with wiper arm members 112, 114 including adapters 160, 162 and the drive gears 132, 134 rotate in a first direction at a same first (speed) rate. The swing link 140 with swing link members 142, 144 and the positioning cogs 136, 138 rotate in a second direction, which is opposite to the first direction, at a same second (speed) rate which is higher than the first rate of the wiper arm members 112, 114 and drive gears 132, 134. The swing link members 142, 144 are configured such that they rotate around an axis of the bolts 148 during the wiper stroke 104. The backplate 150 does not rotate during operation.

A wiper stroke 104 as used herein includes a cycle of a reciprocating swinging movement of the wiper arm 110 with the wiper blade 120, when the wiper system 100 is in operation. The pivoting wiper arm 110 moves from one side of the (windshield) surface 102 to the other, wherein a cycle of the reciprocating swinging movement includes one such movement of the wiper arm 110 from one side to the other.

In accordance with an exemplary embodiment of the present disclosure, an angular position of the pivoting wiper arm 110 is used to alter or modify a height of the wiper blade 120 during the wiper stroke 104 such that an arc of a motion path 320 of the wiper blade 120 is reduced (see FIG. 4). A height of the wiper blade 120 is used herein as position of the wiper blade 120 on the surface 102 in a vertical direction Y. The position of the wiper blade 120 in the vertical direction Y is reduced or lowered, so that the wiper blade 120 provides more coverage in a lower center area of the surface 102 during the stroke 104.

FIG. 4 illustrates a perspective view of a section of a vehicle 300 including a windshield wiper system 100 in accordance with an exemplary embodiment of the present disclosure.

The vehicle 300 can be a motorized or non-motorized vehicle such as for example a railway vehicle, a motor vehicle including cars, coaches and busses, a watercraft, an aircraft, a spacecraft etc. The embodiments disclosed herein are primarily described in connection with railway vehicles, such as for example streetcars, light rail vehicles, automatic (airport) shuttles, metros, commuter trains, EMUs (Electric Multiple Units), DMUs (Diesel Multiple Unit), and high-speed trains etc.

The vehicle 300 comprises windshield wiper system 100 as described in detail with reference to FIG. 1, FIG. 2 and FIG. 3. The surface 102 is a windshield of the vehicle 300. A connector assembly 128 couples the pivoting wiper arm 110 to the wiper blade 120.

FIG. 4 illustrates a conventional motion path 310 of a conventional wiper system and a reduced arc motion path 320 of the improved wiper system 100 as disclosed herein. During wiper strokes 104, the wiper arm 110 moves the wiper blade 120 in horizontal direction X (i.e. from one side of the windshield surface 102 to the other side) as well as in vertical direction Y which creates the motion path 320.

The wiper system 100 is configured in such a way that the motion path 320 of the wiper blade 120 is modified and comprises a reduced arc compared to an arc of the conventional motion path 310. Such modification and reduction of the arc of the motion path 320 is achieved by the connector assembly 128 including the gear drive 130 that couples the wiper arm 110 to the wiper blade 120.

An angular position of the pivoting wiper arm 110, based on angle α, alters a height of the wiper blade 120 of the connector assembly 130 during the wiper stroke 104 such that the arc of the motion path 320 is reduced. A height of the wiper blade 120 is used herein as position of the wiper blade 120 on the surface 102 in a vertical direction Y. A position of the wiper blade 120 in the vertical direction Y is reduced or lowered, so that the wiper blade 120 provides more coverage in a lower center area of the surface 102 during the stroke 104.

Figure 5:
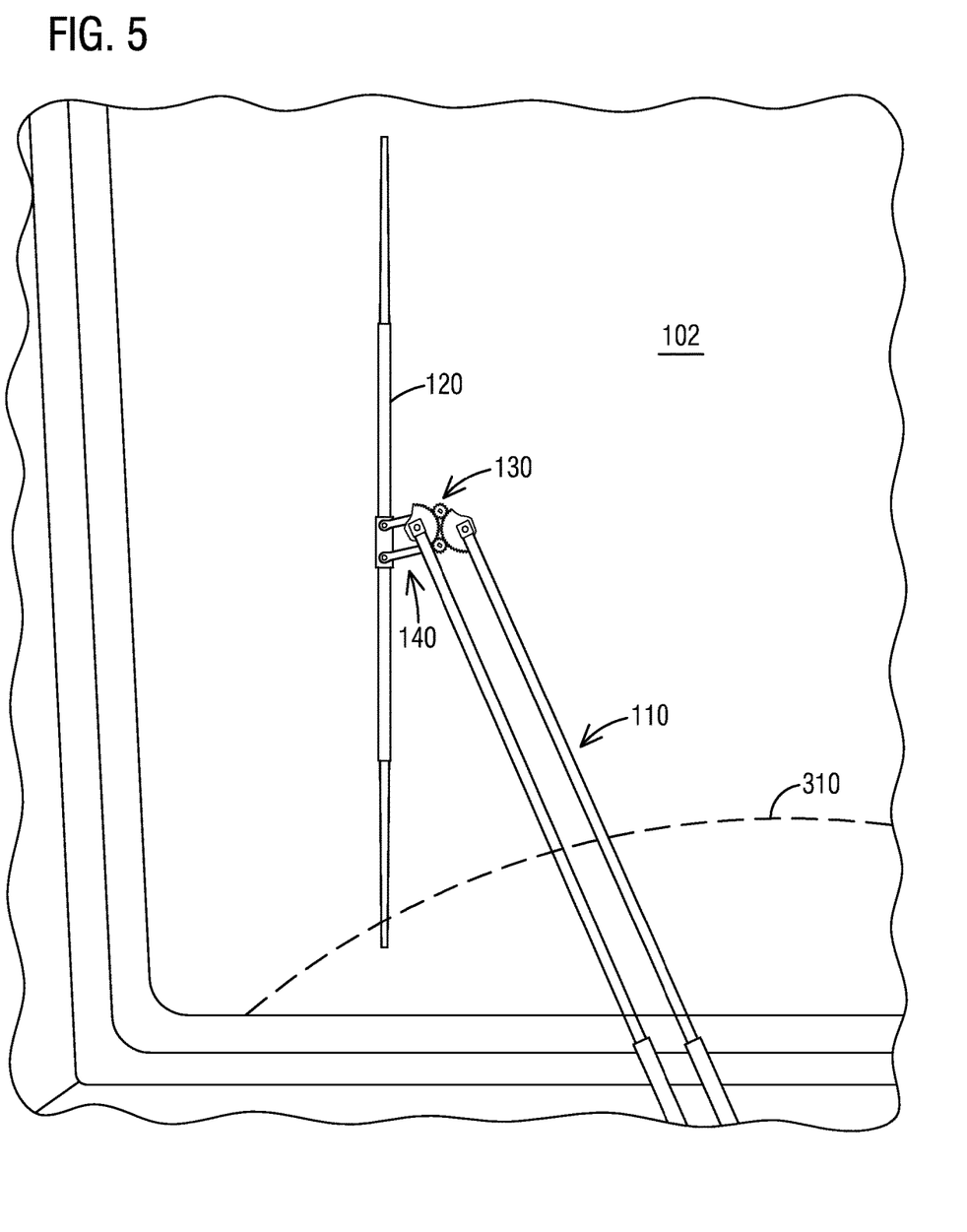
FIG. 5 and FIG. 6 illustrate multiple views of a windshield wiper system in different positions in accordance with exemplary embodiments of the present disclosure.
Figure 6:
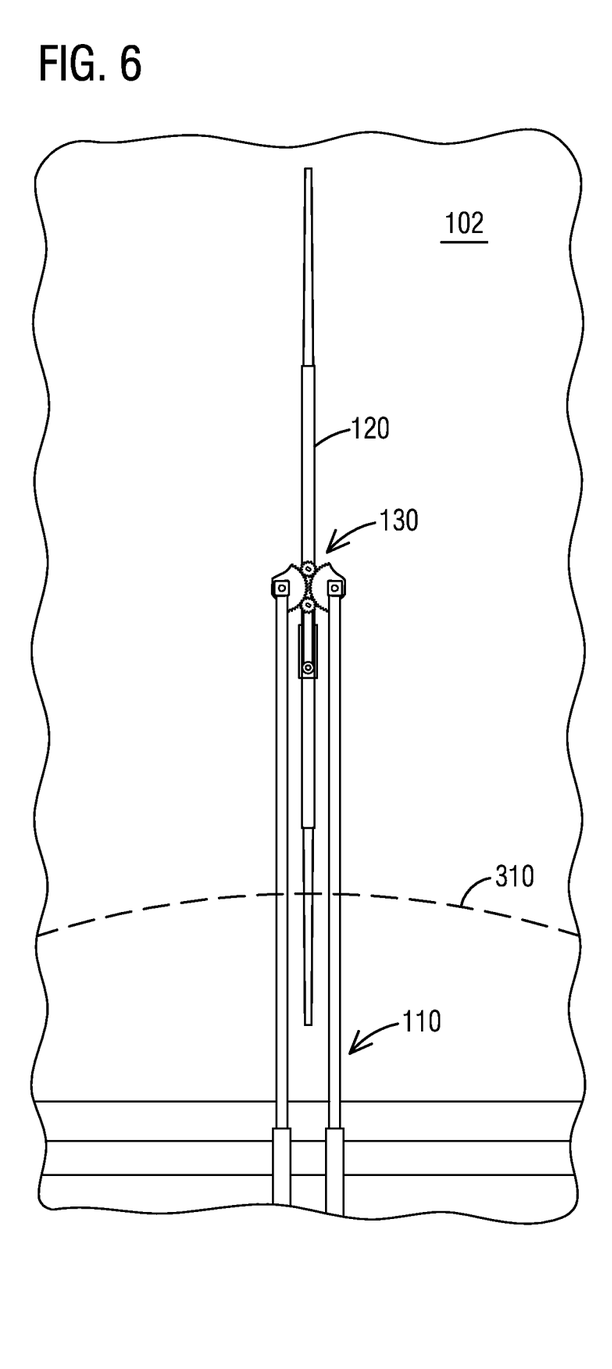

FIG. 5 and FIG. 6 illustrate multiple views of the windshield wiper system 100 in different positions in accordance with exemplary embodiments of the present disclosure.

FIG. 5 illustrates the wiper system 100 in a parked position. In the parked position, the wiper arm 110 and the swing link 140 are at their furthest angle (see angle α of FIG. 4). The gear drive 130 moves the swing link 140 to its highest and furthest out position on the surface 102 of the windshield. As the wiper arm 110 moves back inward toward a center of the surface 102, the gear drive 130 rotates the swing link 140 downward the surface 102 thereby providing better coverage and cleaning in a lower center section of the surface 102.

FIG. 6 illustrates the wiper system 100 in a center position. By the time the wiper blade 120 is centered on the windshield surface 102, the wiper arm 110, wiper blade 120, and swing link 140 are aligned. The gear drive 130 has rotated or pulled the wiper blade 120 to its lowest position in vertical direction Y to provide good wiping coverage in the lower center area of the windshield surface 102. At this point, the wiper blade 120 achieves maximum distance below the conventional path 310. After the wiper blade 120 has passed the center position and during movement of the wiper blade 120 toward the side(s) of the windshield surface 102, the gear drive 130 rotates or moves the swing link 140 to its highest position (upward) in vertical direction Y.

Using the improved wiper system 100, the movement of the wiper blade 120 in vertical direction Y is modified (the vertical movement is less or reduced), because part of the vertical movement is transferred from the wiper blade 120 to the connector assembly 128. Thus, more wiper coverage is provided in the lower center area of the surface 102 which improves visibility for operator(s) of the vehicle 300.

Exemplary embodiments described herein are illustrative, and many variations can be introduced without departing from the spirit of the disclosure or from the scope of the appended claims. For example, elements and/or features of different exemplary embodiments may be combined with each other and/or substituted for each other within the scope of this disclosure and appended claims.

The invention claimed is:

1. A windshield wiper system comprising: a pivoting wiper arm;
    a wiper blade for wiping a surface, and
    a connector assembly coupling the pivoting wiper arm to the wiper blade, the connector assembly comprising a gear drive including at least one drive gear and at least one positioning cog,
    wherein the gear drive rotates the wiper blade based on an angular position of the pivoting wiper arm such that an arc of a motion path of the wiper blade is reduced,
    wherein the pivoting wiper arm comprises a first arm member and a second arm member,
    wherein the gear drive comprises a first drive gear and a second drive gear, wherein the first drive gear is coupled to the first arm member and the second drive gear is coupled to the second arm member,
    wherein the gear drive comprises a first positioning cog and a second positioning cog,
    wherein the first and second positioning cogs are in engagement with the first and second drive gears,
    wherein the connector assembly further comprises a swing link coupled to the wiper arm,
    wherein, during operation, the wiper arm and the first and second drive gears rotate in a first direction at a first same speed rate, and
    wherein the swing link and the first and second positioning cogs rotate in a second direction opposite to the first direction at a second same speed rate which is higher than the first speed rate.

2. The windshield wiper system of claim 1, wherein at least one of the first and second drive gear is coupled to the wiper arm and at least one of the first and second positioning cog is coupled to the wiper blade.

3. The windshield wiper system of claim 2, wherein the swing link comprises a first swing link member and a second swing link member, and wherein the first positioning cog is coupled to the first swing link member and the second positioning cog is coupled to the second swing link member.

4. The windshield wiper system of claim 2, wherein the wiper arm, the wiper blade and the swing link are aligned when the wiper blade is in a center position on the surface.

5. The windshield wiper system of claim 1,
    wherein the swing link comprises a first swing link member and a second swing link member, and
    wherein the first positioning cog is coupled to the first swing link member and the second positioning cog is coupled to the second swing link member.

6. The windshield wiper system of claim 1,
    wherein the connector assembly further comprises a backplate.

7. The windshield wiper system of claim 6,
    wherein the backplate comprises a four-sided shape with rounded edges.

8. The windshield wiper system of claim 6,
    wherein the backplate is arranged between the gear drive and the swing link, and
    wherein the backplate provides a connection between the swing link and the wiper arm.

9. The windshield wiper system of claim 7,
    wherein the backplate is arranged between the gear drive and the swing link, and wherein the backplate provides a connection between the swing link and the wiper arm.

10. The windshield wiper system of claim 1, wherein the wiper arm, the wiper blade and the swing link are aligned when the wiper blade is in a center position on the surface.

11. A vehicle comprising a windshield wiper system as claimed in claim 1.

12. The vehicle of claim 11, wherein the vehicle is a railway vehicle.

* * * * *